Aug. 30, 1949.　　　　F. H. BOGART　　　　2,480,700
STOCK FEEDING MECHANISM
Original Filed Feb. 21, 1942　　　　2 Sheets-Sheet 1
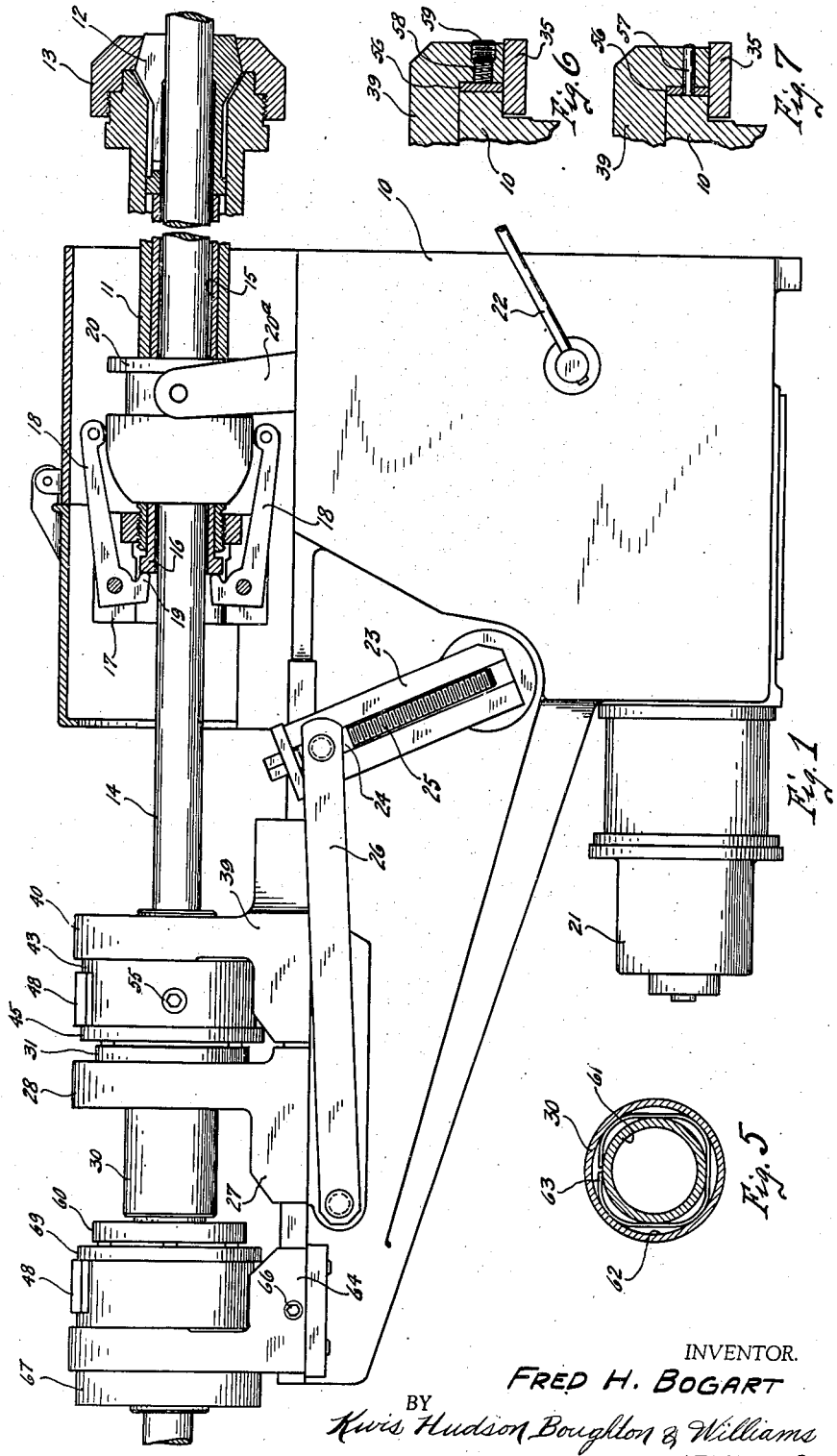
INVENTOR.
FRED H. BOGART
BY
Kwis Hudson Boughton & Williams
ATTORNEYS Aug. 30, 1949.   F. H. BOGART   2,480,700
STOCK FEEDING MECHANISM
Original Filed Feb. 21, 1942   2 Sheets-Sheet 2
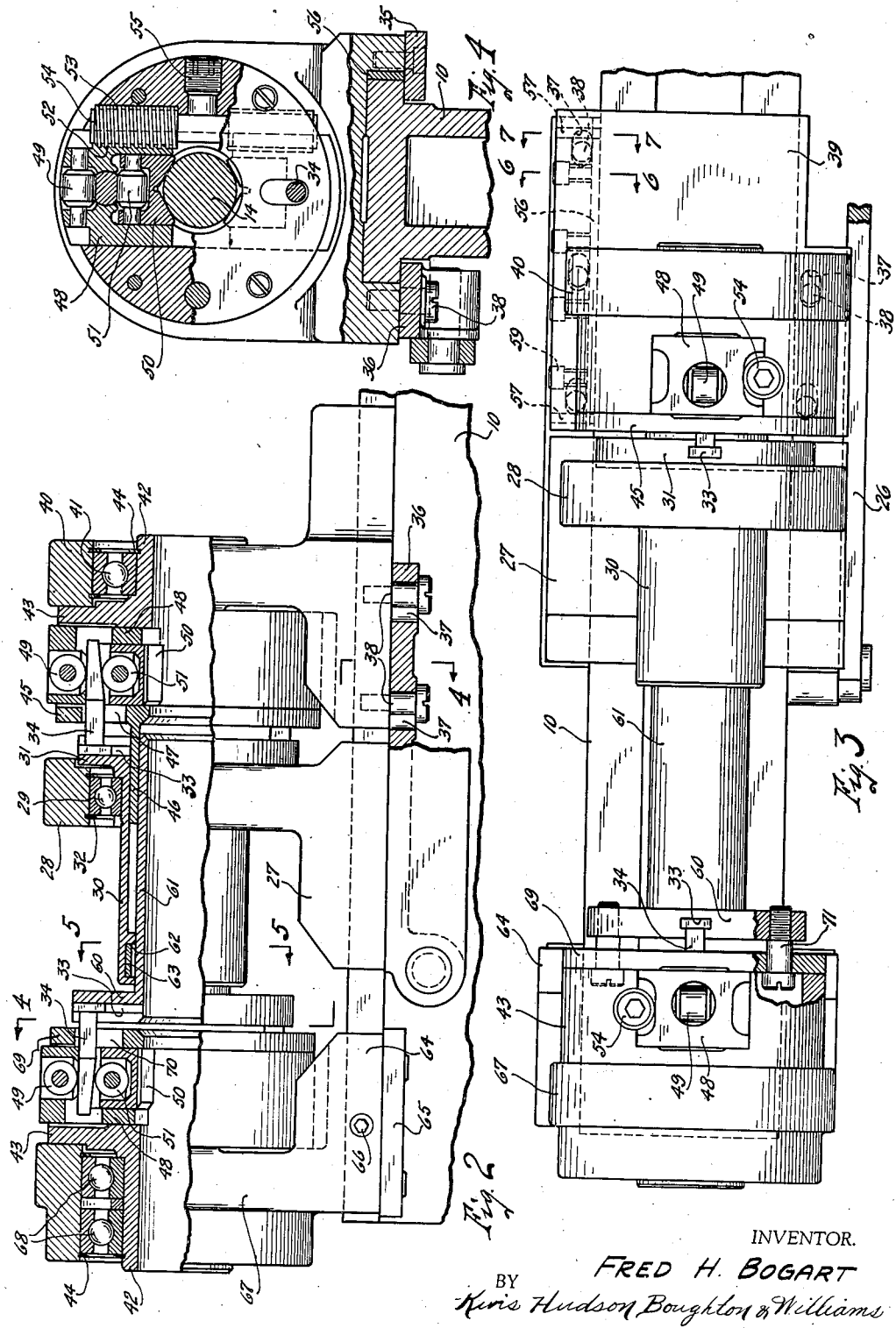
INVENTOR.
FRED H. BOGART
BY
Kris Hudson Boughton & Williams
ATTORNEYS Patented Aug. 30, 1949

2,480,700

UNITED STATES PATENT OFFICE 2,480,700

STOCK FEEDING MECHANISM

Fred H. Bogart, South Euclid, Ohio, assignor to The Warner & Swasey Company, Cleveland, Ohio, a corporation of Ohio Original application February 21, 1942, Serial No. 431,809, now Patent No. 2,388,594, dated November 6, 1945. Divided and this application September 29, 1943, Serial No. 504,205

5 Claims. (Cl. 29—62)

This invention relates to a machine tool and particularly to the stock feeding and gripping mechanism thereof.

This application is a division of my application Serial No. 431,809, filed February 21, 1942, now Patent No. 2,388,594, granted November 6, 1945.

The principal object of the invention is to provide an improved stock feeding and gripping mechanism for a machine tool.

Another object is to provide an improved stock feeding and gripping mechanism for a machine tool wherein the parts are so formed and arranged as to perform their operative functions in the correct sequence and within predetermined time periods, thus increasing the efficiency of the mechanism.

Another object is to provide an improved stock feeding mechanism for a machine tool.

A still further object is to provide an improved stock feeding mechanism for a machine tool which functions to feed the stock uniformly in predetermined lengths, thus obviating the necessity, in many instances, of using stock stops.

A still further object is to provide an improved stock feeding and gripping mechanism which functions to grip and centralize the stock at a point outwardly of the stock feeding portion of the mechanism to prevent slipping thereof and which acts to maintain the stock against endwise movement under machining operations as well as holding the stock against whipping action while rotating.

Further and additional objects and advantages not specifically referred to above will become apparent during the detailed description of an embodiment of the invention which will be set forth hereinafter.

Referring to the accompanying drawings,

Fig. 1 is a front view, partly in elevation and partly in section, of a stock feeding and gripping mechanism.

Fig. 2 is a view, partly in elevation and partly in section, of the stock gripping and feeding means shown in Fig. 1 and on a larger scale.

Fig. 3 is a top plan view of the stock gripping and feeding means shown in Fig. 2 and with the parts thereof in different relationship.

Fig. 4 is a sectional view taken on irregular line 4—4 of Fig. 2, looking in the direction of the arrows.

Fig. 5 is a detail sectional view taken substantially along line 5—5 of Fig. 2, looking in the direction of the arrows, and Figs. 6 and 7 are detail sectional views taken respectively substantially along lines 6—6 and 7—7 of Fig. 3, looking in the direction of the arrows.

It will be understood that the stock feeding and gripping mechanism embodying the present invention is shown by way of illustration as functioning in conjunction with a work spindle which extends into and is supported by the headstock of a machine tool, as is well known in the art and therefore said headstock has not been illustrated herein. It will be understood also that the housing which supports the stock feeding and gripping mechanism is secured by suitable means to the end of such headstock.

Referring to Fig. 1, the housing is indicated at 10, while the work spindle is shown at 11. The spindle is shown as provided with a collet of the push-out type and having spring jaws 12 which have inclined arcuate surfaces cooperating with similarly inclined annular surfaces on the collet hood 13 which is screwed onto the end of the work spindle 11. It will be understood that movement of the collet toward the right, as viewed in Fig. 1, will cause the jaws to be cammed radially inwardly to grip the work 14. Slidably supported in the bore of the work spindle 11 is a collet sleeve 15 which has its right hand end abutting the collet while its left hand end projects beyond the work spindle outside the headstock and is provided with an annular shoulder 16. A finger housing 17 is mounted adjustably on the work spindle 11 and this finger housing has pivotally mounted therein fingers 18 in the form of bell crank levers. The fingers 18 are provided with heel portions 19 contacting the annular shoulder 16 of the collet sleeve. The fingers also are provided with rollers carried by the ends of the long arms of the levers and engageable with the periphery of a cone 20 that is slidably mounted on the work spindle and has an annular groove formed therein in which are located rollers carried by lever arms 20ª which straddle the cone as fully explained in said copending application Serial No. 431,809, of which the present application is a division, one of said lever arms being shown in Fig. 1. It will be understood that when said lever arms are rocked to move said cone toward the left, as viewed in Fig. 1, the fingers 18 will be spread to cause the heel portions 19 to press against the annular shoulder 16 of the collet sleeve and move the sleeve and collet toward the right, whereupon the collet jaws 12 are cammed inwardly by the collet hood 13 to stock gripping position. Conversely, when the lever arms are rocked in the opposite direction to move the cone 20 toward the right the outward pressure on the fingers 18 is relieved, whereupon the collet sleeve and collet move toward the left under the action of the spring jaws and the gripping of said jaws on the work is relieved. The mechanism by which the lever arms 20$^a$ are rocked to effect the gripping and releasing movements of the collet is fully illustrated and described in said copending application Serial No. 431,809 and need not be set forth herein.

The mechanism last referred to is operated by an electric motor 21 and is controlled by lever 22. The mechanism which operates the lever arms 20$^a$ to cause the gripping and releasing of the collet also actuates a lever arm 23 as fully explained in said copending application Ser. No. 431,809. This lever arm 23 is provided with a T-slot extending longitudinally of the arm and in which a shoe 24 is mounted for adjustment lengthwise of the slot by means of an adjusting screw 25. The shoe 24 is pivotally connected to one end of a link 26, the opposite end of which link is pivotally connected to a slide 27 mounted on ways formed on the upper side of an extension of the housing 10. The slide 27 has an upstanding portion 28 provided with a central opening therethrough and rotatably supporting therein by means of antifriction bearings 29 carried by the portion 28 a sleeve 30 which at its right hand end is provided with an outstanding flange 31 that engages in a recess formed in the right hand face of the portion 28. It will be seen that movement of the slide 27 and portion 28 toward the right as viewed in the drawings will cause a corresponding movement of the sleeve 30.

The antifriction bearings 29 are held in position by a suitable lock washer 32, well known in the art, and which lock washer engages in a recess formed in the sleeve 30, wherefore endwise movement of the slide 27 and portion 28 toward the left also causes a similar movement of the sleeve 30. In other words, the portion 28 of the slide 27 and the sleeve 30 move endwise together while the sleeve 30 can rotate freely in the portion 28.

The flange 31 of the sleeve 30 is provided with a plurality of radially extending T-slots 33, there being two of these T-slots shown in the present illustration and they are arranged diametrically with respect to each other, although it will be understood that a greater or lesser number of T-slots could be employed if desired. The T-slots 33 adjustably guide and support the heads of wedge members 34, which members project perpendicularly from the flange 31 toward the right as viewed in the drawings. The heads of the wedge members 34 can be adjusted in the T-slots 33 to varying radial distances from the center of the sleeve 30, while the wedge members will move endwise with the sleeve due to the T-slot connection therewith.

The slide 27 has secured thereto rear and front gibs 35 and 36 which retain the slide on the ways. The front gib 36 is extended toward the right as viewed in Fig. 2 and is provided with elongated slots 37 through which slots extend shouldered screws 38 that are threadedly engaged with a slidable support 39. The support 39 has an upstanding portion 40 provided with a central opening and rotatably supporting in said opening by means of antifriction bearings 41 a sleeve 42 which is provided at its inner end with an outstanding flange 43 contacting the left hand side of the upstanding portion 40 of the support 39. The sleeve 42 can rotate freely in the portion 40 but will move endwise with said portion and with the support 39 due to the engagement of the flange 43 with the portion 40 and to the engagement of a lock washer 44 for the antifriction bearings 41 with a groove in the sleeve 42 and in the portion 40. The flange 43 of the sleeve 42 is provided with radially extending openings arranged diametrically to each other and slidably receiving radially adjustable jaw carriers later to be referred to. A plate 45 is secured to the left hand face of the flange 43 and has an integral sleeve portion 46 telescopically extending into the sleeve 30.

It will be understood that the plate 45 and sleeve portion 46 could be integral with the sleeve 42 and the flange 43 but for the purposes of manufacture and assembly the plate and its sleeve portion are made as a separate element detachably connected to the flange 43. The plate 45 is provided with radially extending openings 47 substantially of the width of the wedge members 34 and which members slidably pass through the openings 47 and into the radially extending openings formed in the flange 43.

It will be seen that the sleeve 42, flange 43, plate 45 and its sleeve portion 46 can move endwise relative to the sleeve 30 but will rotate with said sleeve 30 since the wedge members 34 in the openings 47 act as keys for this rotative movement.

As previously referred to, the radial openings in the flange 43 movably support jaw carriers 48. Although Fig. 4 actually shows the construction of the stationary support that is to the left of the slide 27 in Fig. 2, reference may be made to said Fig. 4 in connection with the description of the slidable support 39 that is at the right of the slide 27 since both supports include similar elements designated by the same reference characters.

The carriers 48 are provided with openings through which the wedge members 34 project. The carriers 48 above the wedge members 34 support rollers 49 in contact with the upper straight side of the wedge members 34. The carriers 48 slidably support beneath the wedge members 34 radially movable jaws 50 which carry rollers 51 that contact the inclined surface of the wedge members 34. The jaws 50 are adapted to engage and grip the work or bar stock 14 when they are moved radially inwardly relative to the carriers by the wedging action of the wedge members 34.

The carriers 48 are radially adjustable with an equalized movement for different diameter stock by the means now to be explained. The carriers on one side thereof are provided with threaded portions 52 engaging with right and left handed screw portions 53 formed on a shaft extending through the flange 43 and along side and parallel with the jaw carriers 48. The shaft with the screw portions 53 can be rotated by means of a suitable wrench fitting in the socket 54 at the upper end of the shaft and accessible from the upper side of the flange 43.

It will be understood that rotation of the shaft effects equalized inward or outward movement of the carriers 48 to approximately adjust the jaws 50 for different diameter stock. The shaft can be locked against rotation after it has been rotated for adjustment by means of a lock screw 55 mounted in the flange 43.

At the rear of the slidable support 39 an elongated flat friction plate 56 is located between the depending portion of the support and the rear surface of the rear way on the extension of the housing 10. The plate 56 is connected to the support 39 to move therewith by pins 57, see Figs. 3 and 7. The depending portion at the rear of the support 39 is provided with a plurality of threaded openings spaced longitudinally of the support and in which are mounted coil springs 58 held in position by threaded plugs screwed into the openings, see Figs. 3 and 6. It will be seen that the springs 58 exert pressure on the plate 56 and cause the same to frictionally engage with the rear surface of the rear way on the housing 10 thus producing a friction drag to the movement of the support 39 for a purpose later to be explained.

At the left of the sleeve 30 is a flange 60 which has an integral elongated sleeve portion 61 telescoping within the sleeve portion 46 and within the sleeve 30 of the flange 31. The sleeve 30 is provided internally and at its left hand end as viewed in the drawing with a circumferential groove 62 formed by an internal rib in the sleeve 30 and by an inwardly extending flange at the left hand end of said sleeve, see Figs. 2 and 5. A spring 63 is mounted in the groove 62 and said spring at alternate circumferentially spaced points contacts the interior of the sleeve 30 and the exterior of the sleeve 61, therefore producing a frictional drag to relative telescopic movement between the said sleeves.

The flange 60 is identical with the flange 31 in that it is provided with a plurality of radially extending T-slots 33 which adjustably support the heads of a plurality of radially movable wedge members 34. A normally stationary support 64 is mounted on the ways of the extension of the housing 10 for adjustment thereon and said support can be clamped and locked in adjusted position against endwise movement on said ways by a clamp 65 and a lock screw 66. The stationary support 64 has an upstanding portion 67 which is provided with a circular opening in alignment with the opening in the portion 28 of the slide 27 and also with the similar opening in the portion 40 of the slidable support 39. The portion 67 is substantially the same as the portion 40, except that it is of greater width and can accommodate a pair of antifriction bearings 68.

The work gripping means carried by the portion 67 of the stationary support 64 is identical with the work gripping means carried by the portion 40 of the slidable support 39 and the parts thereof have been given the same reference characters. As already explained, the work gripping means comprises a sleeve 42 which is provided with an outstanding flange 43 contacting in this instance the right hand side of the portion 67 of the stationary support 64. The sleeve 42 rotates freely in the upstanding portion 67 but is held against endwise movement relative to said portion by the flange 43 and by the engagement of the lock washer 44 for the antifriction bearings 68 with a groove in the sleeve 42 as will be well understood.

As already explained, the flange 43 of the sleeve 42 is provided with radially extending openings arranged diametrically to each other and slidably receiving radially adjustable jaw carriers 48. A plate 69 is secured to the right hand face of the flange 43 and corresponds to the plate 45 but is not provided with an integral sleeve portion. The plate 69 is provided with radially extending openings 70 corresponding to the openings 47 in the plate 45 and substantially of the width of the wedge members 34, so that said wedge members can slidably pass through the openings 70 and into the radially extending openings formed in the flange 43. The plate 69 is also provided with openings through which extend headed stop screws 71 which are screwed into the flange 60 and have their heads to the left of the plate 69. The purpose of the screws 71 is to limit relative movement between the flange 60 and the plate 69, see Fig. 3.

It will be seen that the sleeve 42, flange 43 and plate 69 will rotate with the flange 60 since the wedge members 34 act as keys. It will also be seen, however, that the wedge members 34 can move endwise relative to the plate 69 and the flange 43. It will further be seen that the wedge members 34 can move radially of the flange 60 and the flange 43 in the openings 70 when the jaw carriers 48 are adjusted radially.

As already explained, the carriers 48 are provided with openings through which the wedge members 34 project. The carriers 48 above the wedge members 34 support rollers 49 in contact with the upper straight side of the wedge members 34 and beneath the wedge members the carriers slidably mount radially movable work gripping jaws 50 which carry rollers 51 that contact the inclined lower surfaces of the wedge members 34. The jaws 50 are adapted to engage and grip the work or bar stock 14 when the jaws are moved radially inwardly by the wedging action of the wedge members 34. The carriers 48 can be adjusted radially inwardly and outwardly for different diameter work by the shaft having the right and left hand screw portions 53 as has already been explained.

The operation of the stock feeding and gripping mechanism disclosed and heretofore described will now be explained. It will be understood that the work gripping mechanism in the form of the collet 12 and the actuating means for imparting the work feeding movement and restoring movement to the slide 27 function in the manner described in detail in said copending application Serial No. 431,809, of which the present application is a division. In Fig. 1 the collet jaws 12 are gripping the work. At this time the work gripping jaws 50 carried by the stationary support 64 are also gripping the work 14, since the wedge members 34 carried by the flange 60 are in wedging position, see Fig. 2. Also at this time the slide 27 is in the position it occupies before the work feeding movement is imparted thereto.

Assuming that the operator has moved the control handle 22 to effect a release of the gripping action of the collet jaws on the work and the feeding of a length of the stock for a new work piece, it will be understood that the movement of the link 20 causes the slide 27 to start moving toward the right, as viewed in Fig. 2. The very first part of this movement of the slide 27 toward the right accomplishes two things simultaneously; one of these things is that as the portion 28 of the slide 27 moves toward the right it carries with it the flange 31 and the sleeve 30 and forces the wedge members 34 carried by said flange 31 endwise toward the right between the rollers 49 and 51 to move the work gripping jaws 50 of the slidable support 39 into gripping relation with the work 14, the slidable support 39 being frictionally held against movement at this time as will later be referred to. This movement of the sleeve 30 with the slide 27 also effects movement toward the right of the sleeve 61 and the flange 60 due to the frictional grip of the spring 63 on the sleeve 61. The movement of the sleeve 61 and flange 60 moves the wedge members 34 carried by said flange toward the right and relieves the gripping pressure upon the work of the jaws 50 that are associated with the stationary support 64.

The initial portion of the movement of the slide 27 toward the right does not move the slidable support 39, since the latter is held in position by the friction plate 56 and also because there is a lost motion connection between front gib 36 and the screws 38 by virtue of the slots 37. Consequently, the movement toward the right of the wedges 34 carried by the flange 31 results in radially moving the jaws 50 associated with the slidable support 39 into work gripping position. The continued movement toward the right of the slide 27 after the jaws 50 have gripped the work overcomes the resistance of the friction plate 56 and causes the slidable support 39 and the jaws carried thereby to move toward the right as a unit with the slide 27. This unitary movement of the slide 27 and slidable support 39 effects a feeding movement toward the right of the stock 14. During this feeding movement the slide 30 moves relative to the sleeve 61 since the heads of the stop screws 71 carried by the flange 60 have already engaged with the inner side of the plate 69, see Fig. 3. During the feeding movement just referred to the friction plate 56 constantly exerts a drag to the movement of the slidable support 39 and consequently the wedge members 34 act continuously to urge the jaws 50 into tighter work gripping relationship. The feeding movement of the slide 27 therefore imparts movement toward the right of the movable support 39 and the work 14, it being observed that the slots 37 are of such length the screws 38 do not contact with the ends of the slots during the feeding movement and that the wedges form the actuating connection between the slide and the movable support 39. At the end of the feeding movement the parts are in the position shown in Fig. 3.

As previously stated, the amplitude of movement toward the right of the slide 27 can be accurately controlled by adjusting the screw 25 to vary the position of the shoe 24. The first part of this movement of the slide effects a positive gripping of the stock by the jaws 50 of the slidable support while the remainder of the movement effects a definite length of feed to the stock, thus obviating the need of using stock stops to determine the length of feed.

Assuming that the collet jaws 12 have again gripped the stock and the link 26 moves in a direction to restore the slide 27 to its original position the following sequence of operations occurs. The first part of the movement of the slide 27 toward the left effects no movement of the slidable support 39, due to the lost motion connection and to the grip of the friction plate 56. However, the first part of the restoring of the slide 27 moves the wedge members 34 carried by the flange 31 in a left hand direction to relieve the gripping pressure on the work of the jaws 50 associated with the slidable support 39. Simultaneously with the relieving of the gripping pressures of the jaws 50 just referred to, the sleeve 61 moves toward the left along with the sleeve 30 due to the friction grip of the spring 63 and consequently the wedge members 34 carried by the flange 60 move toward the left and force into gripping relationship with the work 14 the jaws 50 associated with the stationary support 64. At this time the screws 38 come into contact with the right hand ends of the slots 37 in the front gib 36, with the result that continued movement of the slide 27 toward the left moves the slidable support 39 also toward the left. This continued movement of the slide 27 toward the left causes the sleeve 30 to move toward the left over the sleeve 61, but due to the frictional grip of the spring 63 on the sleeve 61 the latter is constantly urged toward the left and the wedge members 34 carried by the flange 60 constantly urge the jaws 50 of the stationary support 64 into holding and gripping relationship with the work 14 during the machining operation and until the parts again function to feed the stock. The flange 60 does not come into contact with the plate 69 during this movement toward the left, it being understood that the heads of the screws 71 move toward the left away from the left hand face of the plate 69. In other words, the movement of the flange 60 and the sleeve 61 toward the left is stopped by the action of the wedges 34 urging the jaws into gripping relationship with the work and not by the engagement of the flange 60 with the plate 69. Therefore a tight gripping action of the jaws 50 on the work piece is established and maintained.

It will be appreciated that the jaws 50 associated with the stationary support 64 exert their gripping pressure on the work piece during the entire period of the machining operation and consequently the work 14 is held centrally in a position at a point substantially removed from the point at which the collet jaws 12 grip the work and outwardly of the stock feeding portion of the mechanism, wherefore whipping of the bar stock or work inwardly of said point is substantially eliminated. The jaws 50 of the stationary support 64 also assist the collet jaws 12 in holding the work under heavy machining operations and act to prevent any endwise movement of the work.

Of course the stock feeding and gripping mechanism described herein may be employed to hold and feed various kinds of stock and independently of any stock gripping means such as the collet shown or other well known forms of stock gripping means such as might be employed in the work spindle of a turret lathe.

Although a preferred embodiment of the invention has been illustrated and described herein it will be understood that the invention is susceptible of various modifications and changes within the scope of the appended claims.

Having thus described my invention, I claim:

1. A stock feeding mechanism comprising a movable stock feeding support and a stationary support each provided with stock gripping means, movable means intermediate said supports and provided with elements certain of which elements actuate the stock gripping means of the movable support and then act as a driving connection between said movable means and said support to cause said support to move with said movable means when said movable means is moved in one direction and others of which actuate the stock gripping means of the stationary support when said movable means is moved in the opposite direction.

2. In a stock feeding mechanism, a movable stock feeding support and a stationary support spaced therefrom and each provided with stock gripping means, and movable means intermediate said supports and having a lost motion operative connection with said movable stock feeding support and including telescoping sections having a frictional operative connection therebetween, each of said sections being provided with elements, the elements of said sections acting alternately to actuate or release the stock gripping means of their cooperating support depending upon the direction of movement of said movable means, said elements which actuate the stock gripping means of the movable support then acting as a driving connection to cause unitary movement of said movable support and said movable means.

3. In a stock feeding mechanism, a movable stock feeding support and a stationary support spaced therefrom and each provided with stock gripping means and means for adjusting the latter for various sizes of stock, and means intermediate said supports and movable relative thereto and provided with elements adjustable automatically with the adjustment of the stock gripping means for actuating or releasing the stock gripping means of one or the other of the supports depending upon the direction of movement of said movable means, said elements which actuate the stock gripping means of the stock feeding support then acting as a driving connection to cause unitary movement of said support and said movable means.

4. A stock feeding mechanism comprising a movable stock feeding support and a stationary support each provided with stock gripping means, and means intermediate said supports and movable relative thereto and provided with elements for actuating one or the other of said stock gripping means depending upon the direction of movement of said last named means, certain of said elements being adjacent to the movable support and other of said elements being adjacent to the stationary support, said elements which are adjacent to the movable support acting as a driving connection between said means and said movable support to cause the same to move in unison after the same elements have actuated the stock gripping means of said movable support.

5. In a stock feeding mechanism, a pair of supports one of which is movable and acts as a stock feeding support and the other of which is stationary and each provided with stock gripping means, and movable means intermediate said supports and operatively associated therewith and including relatively movable sections each of which sections is provided with actuating elements, the elements of one of said sections acting to actuate and release the stock gripping means of the stationary support while the elements of another of said sections act simultaneously to actuate and release the stock gripping means of the movable stock feeding support depending upon the direction of movement of said movable means, said elements which actuate the stock gripping means of the stock feeding support then acting as a driving connection to cause unitary movement of said stock feeding support and said movable means.

FRED H. BOGART.

REFERENCES CITED

The following references are of record in the file of this patent:

UNITED STATES PATENTS

| Number | Name | Date |
| --- | --- | --- |
| 143,306 | Spencer | Sept. 30, 1873 |
| 332,889 | Gerry | Dec. 22, 1885 |
| 755,322 | Smith | Mar. 22, 1904 |
| 1,636,406 | Braren | July 19, 1927 |
| 2,249,325 | Pruckner | July 15, 1941 |
| 2,261,380 | Jelinek et al. | Nov. 4, 1941 |
| 2,343,914 | Lloyd | Mar. 14, 1944 |

FOREIGN PATENTS

| Number | Country | Date |
| --- | --- | --- |
| 486,091 | Great Britain | May 27, 1938 |
| 107,956 | Australia | July 11, 1939 |